(12) United States Patent
Sawada et al.

(10) Patent No.: US 6,259,582 B1
(45) Date of Patent: Jul. 10, 2001

(54) CHUCKING DEVICE IN FDD

(75) Inventors: Toru Sawada; Atsushi Masuda, both of Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/388,180

(22) Filed: Sep. 1, 1999

(30) Foreign Application Priority Data

Sep. 3, 1998 (JP) .................................................. 10-250086

(51) Int. Cl.[7] .................................................. G11B 17/02
(52) U.S. Cl. .................................................. 360/99.04
(58) Field of Search .............................. 360/99.04, 99.08

(56) References Cited

U.S. PATENT DOCUMENTS 5,010,427 * 4/1991 Taguchi et al. .................. 360/99.08
5,126,900 * 6/1992 Munekata .......................... 360/99.08

* cited by examiner

Primary Examiner—Robert S. Tupper
(74) Attorney, Agent, or Firm—Binks Hofer Gilson & Lione (57) ABSTRACT

A chucking device in a floppy disk drive, having a drive pin extending loosely through a drive pin through hole of a rotor yoke and also through a cutout portion of a magnetic disk and inserted loosely into a drive pin aperture formed in a center hub of a floppy disk, and further having a plate spring member mounted to the underside of the rotor yoke and formed so as to push the drive pin upward and outward. The lower end portion of the drive pin is loosely fitted in a cutout portion formed in the plate spring member, and the cutout portion of the magnetic disk has a conduction path for contact with the drive pin, the conduction path being inclined in a gradually retreating direction as the distance from the rotational axis of the rotor yoke becomes longer.

6 Claims, 4 Drawing Sheets

CHUCKING DEVICE IN FDD

BACKGROUND OF THE INVENTION

1. Field of the Invention

The present invention relates to a chucking device in an FDD (floppy disk drive) capable of preventing an eccentric rotation of a floppy disk in a positive and inexpensive manner at the time of loading the floppy disk into the FDD.

2. Description of the Related Art

Figure 6:
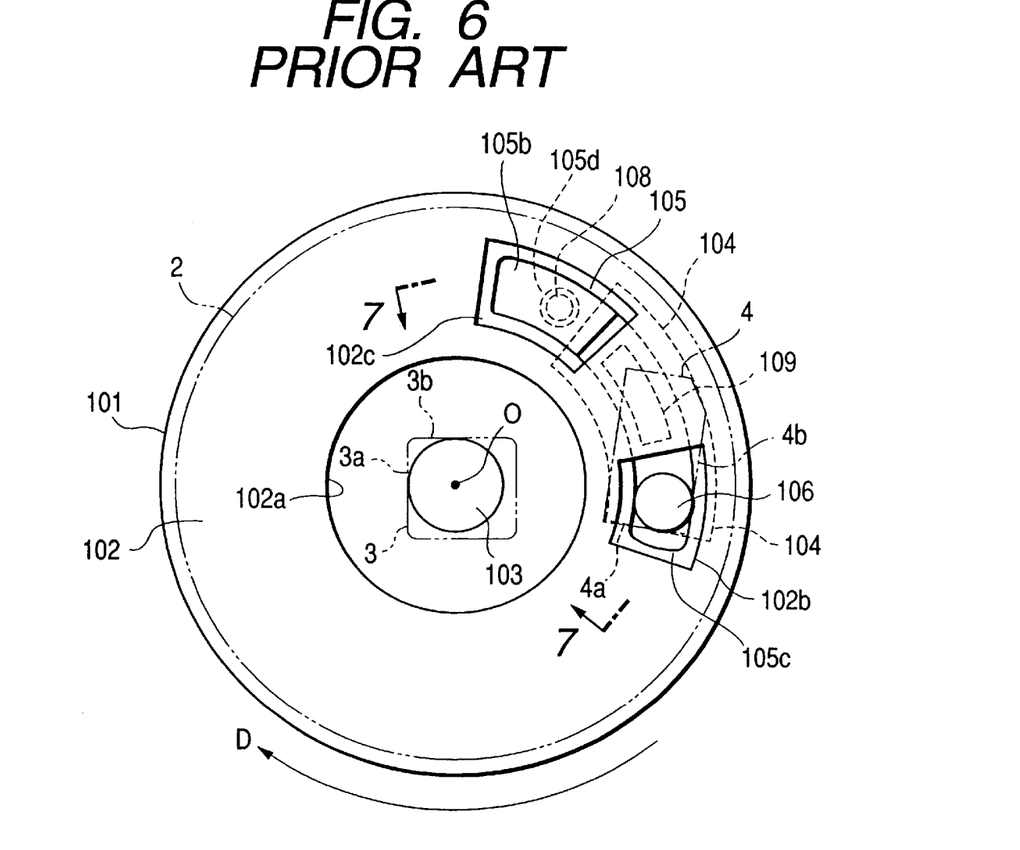
FIG. 6 is a plan view showing an example of a conventional chucking device.
Figure 7:
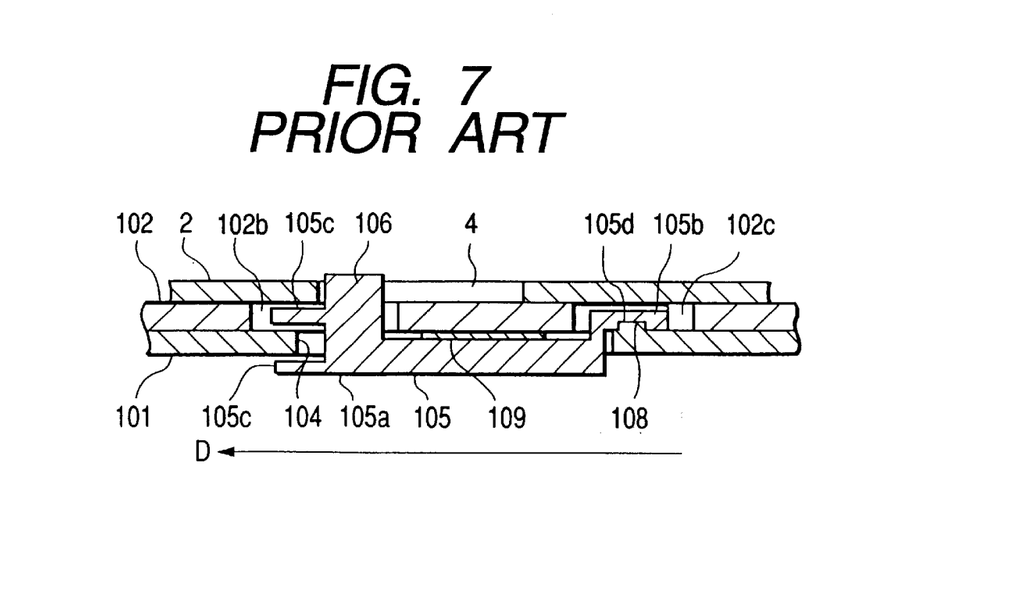
FIG. 7 is a sectional view taken along an arcuate dot-dash line 7—7 in FIG. 6.

A recording medium, typical of which is a floppy disk, is loaded into an FDD in the form of a disk cartridge in which a thin film-like recording disk is received in a case, the recording disk is rotated within the FDD, and recording data are inputted and outputted through a write/read window formed in the case and having a shutter. It is necessary that the recording disk be capable of being removed easily in its received state in the case and aligned exactly with a rotational axis of the FDD at the time of write or read and that the rotating speed thereof be controlled accurately. To meet these requirements, such a chucking device as shown in FIGS. 6 and 7 has heretofore been used for the FDD.

A center hub formed by a ferromagnetic metal disk is centrally mounted on a recording disk of a floppy disk. As shown in FIGS. 6 and 7, a generally square central aperture 3 is formed centrally of the center hub which is indicated at 2, and a generally rectangular drive pin aperture 4 is formed in a peripheral position of the center hub. The drive pin aperture 4 has a front edge 4a at a front position in a rotational direction of a rotor yoke and an outer edge 4b in a direction ("outer" hereinafter) away from a rotational center of the rotor yoke.

On the other hand, the FDD is provided with a rotor yoke 101 which is constituted by a ferromagnetic metal disk and which is rotated in a certain direction (indicated at "D" in the figures) by means of a motor (not shown) Onto the rotor yoke 101 is fixed a magnetic disk (chucking magnet) 102.

A center shaft 103 is erected at a rotational axis O of the rotor yoke 101. The center shaft 103 extends through a central opening 102a of the magnetic disk 102 and is inserted loosely into the central aperture 3 of the center hub.

The term "loosely" as used herein indicates a freely movable state in both horizontal and vertical directions and within a predetermined range.

In the peripheral portion of the rotor yoke 101 is formed a drive pin through hole 104 along the circumference, and a chucking arm 105 formed arcuately along the circumference is loosely fitted in the drive pin through hole 104. An upwardly extending drive pin 106 is formed at a front end portion ("front portion" hereinafter) 105a of the chucking arm 105 facing the rotational direction D of the rotor yoke 101. The drive pin 106 extends loosely through a front aperture 102b formed in the magnetic disk 102 and is inserted loosely into the drive pin aperture 4 of the center hub. At the front portion 105a of the chucking arm 105 are formed two flanges 105c which hold loosely the rotor yoke 101 portion located around the front portion of the drive pin through hole 104 and which support the front portion of the chucking arm 105 so as to be freely movable in both horizontal and vertical directions and within a predetermined range.

On the other hand, the other end portion ("rear portion" hereinafter), indicated at 105b, of the chucking arm 105 extends backward of the upper surface of the rotor yoke 101 at an approximately right angle from the rear end of the drive pin through hole 104, and within a rear aperture 102c formed in the magnetic disk 102 a pivot shaft 108 projecting from the upper surface of the rotor yoke 101 is received in a receiving aperture 105d so as to be pivotable horizontally about the pivot shaft 108 and within the width range of the drive pin through hole 104.

A ferromagnetic plate 109 is mounted on the body of the chucking arm 105, whereby the whole of the chucking arm 105 is attracted magnetically by the magnetic disk 102 and the drive pin 106 is pulled upward at all times.

Upon loading of a floppy disk into the FDD constructed as above, the recording disk is placed on the rotor yoke 101, the center hub 2 mounted on the disk is attracted magnetically by the magnetic disk 102, and the central aperture 3 of the center hub receives the rotor yoke-side center shaft 103 therein. At this time, the drive pin 106 projecting upward from the magnetic disk 102 need not be inserted into the drive pin aperture 4 of the center hub. With the drive pin 106 not inserted into the drive pin aperture 4, the pin 106 is pushed in by the center hub 2 up to the lower surface level of the center hub against the attractive force induced by the ferromagnetic plate 109.

In this state, when a motor (not shown) is turned ON, causing the rotor yoke 101 to rotate fully once at most in the D direction, the top of the drive pin 106 slides on the lower surface of the center hub and is received in the drive pin aperture 4, within which the drive pin rises by virtue of the attractive force of the ferromagnetic plate 109. As the rotor yoke 101 further rotates in the D direction in this state, the drive pin 106 comes into abutment with a front edge 4a of the drive pin hole 4 formed in the center hub 2, so that the chucking arm 105 rotates in a direction away from the rotational axis O, centered on the pivot shaft 108 and the drive pin 106 comes into abutment with the outer edge 4b of the drive pin hole 4. This state will hereinafter be referred to as "front-outer support."

At this time, the center shaft 103 is supported by being abutted against two adjacent sides 3a and 3b of the central aperture 3 of the central hub on the side opposite to the drive pin 106 with respect to the rotational axis O and in this state the center of the recording disk and the rotational axis O of the rotor yoke 101 coincide with each other to complete chucking. In this state the recording disk of the floppy disk can rotate while exactly following up a controlled rotating speed of the rotor yoke 101.

In the use of the chucking arm 105, however, it is necessary to form the pivot shaft 108 on the rotor yoke 101 and in this case it is difficult to adjust the shaft height accurately. Besides, for loose mounting of the chucking arm 105 it is necessary that the drive pin through hole 104 be formed large, and there occurs a distortion at the time of forming such a large aperture by machining, thus giving rise to the problem that the surface oscillation of the rotor yoke 101 increases.

In the chucking arm 105, moreover, since the foregoing front-outer support relies on only the rotational moment of the arm, the recording disk sometimes shifts to a continuous rotation as it is without abutment of the center shaft 103 with two adjacent sides 3a and 3b of the central aperture 3 in the center hub due to, for example, the influence of a sliding friction induced between the chucking arm and the rotor yoke 101 or a sliding friction between the magnetic head and the recording medium. In this state the recording disk continues an eccentric rotation, giving rise to the problem that there occurs an error in writing and reading of data.

There has also been the problem that the mounting of the chucking arm 105 is troublesome and that therefore the manufacturing cost increases.

SUMMARY OF THE INVENTION

The present invention has been accomplished for solving the above-mentioned problems and it is therefore an object of the invention to provide a chucking device in a floppy disk drive which realizes the foregoing front-outer support in a positive and inexpensive manner without using the conventional chucking arm involving many problems and which thereby prevents an eccentric rotation of a recording disk and always ensures correct writing and reading.

In order to solve the above-mentioned problems, according to the present invention there is provided a chucking device in a floppy disk drive, comprising: a rotor yoke adapted to rotate in a predetermined certain direction with a center hub of a floppy disk placed thereon; a magnetic disk fixed onto an upper surface of the rotor yoke and attracting the center hub of the floppy disk magnetically; a center shaft erected at a rotational axis of the rotor yoke and inserted loosely into a central aperture of the center hub through a central opening formed in the magnetic disc; a drive pin extending loosely and successively through a drive pin through hole formed in the peripheral portion of the rotor yoke and then through a cutout portion formed in the magnetic disk, the drive pin being also inserted loosely into a drive pin aperture formed in the peripheral portion of the center hub, the drive pin aperture having a front edge at a front portion thereof in a rotational direction of the rotor yoke and also having an outer edge in a direction away from the rotational axis of the rotor yoke; and a plate spring member mounted to a lower surface of the rotor yoke and formed so as to push the drive pin upward and in a direction away from the rotational axis of the rotor yoke, wherein a lower end portion of the drive pin is loosely fitted in a drive pin mounting portion of the plate spring member, the drive pin through hole of the rotor yoke or the cutout portion of the magnetic disk has a conduction path for contact with the drive pin at a rear portion thereof in the rotational direction of the rotor yoke, the conduction path being inclined in a gradually retreating direction as the distance from the rotational axis of the rotor yoke becomes longer, and when the rotor yoke is rotated with the floppy disk placed on the rotor yoke and with the center shaft inserted into the central aperture of the center hub, the drive pin is inserted into the drive pin aperture of the center hub and comes into abutment, within the drive pin aperture, with the front and outer edges of the drive pin aperture and also with the conduction path.

In the above constitution, when the rotor yoke is rotated with the floppy disk placed on the rotor yoke and the center shaft inserted into the central aperture of the center hub, the drive pin is pushed upward by the plate spring member, so that while the rotor yoke is rotated fully once at most, the drive pin is sure to be inserted into the drive pin aperture of the center hub. Further, when the rotor yoke rotates in a predetermined certain direction, since the drive pin is pushed outward by the plate spring member, the drive pin is inserted into the drive pin aperture of the center hub and comes into abutment, within the drive pin aperture, not only with the front edge of the drive pin aperture but also with the aforesaid conduction path, then is held between the front edge and conduction path and is thereby pushed outward into abutment with the outer edge of the drive pin aperture, whereby the foregoing front-outer support is realized and a positive chucking for the floppy disk is attained.

Further, according to the present invention, there is provided a chucking device in a floppy disk drive, wherein the plate spring member is constituted by a single plate, the plate being bent at a right angle to form an upward pressing portion which faces the rotor yoke and a side pressing portion perpendicular to the rotor yoke, the upward pressing portion and side pressing portion being formed so as to push the drive pin upward and outward, respectively.

In the above constitution, a single plate spring member can be endowed with both a function of pushing the drive pin upward and a function of pushing it outward, whereby the chucking mechanism is simplified.

Further, according to the present invention, there is provided a chucking device in a floppy disk drive, wherein the drive pin mounting portion of the plate spring member has a cutout portion for insertion therein of the lower end portion of the drive pin, and the lower end portion of the drive pin thus inserted into the cutout portion is formed with upper and lower flanges for holding the plate spring member therebetween in a vertically loose condition.

Consequently, the drive pin is prevented from falling off the plate spring member while being mounted loosely to the plate spring member.

Further, according to the present invention, there is provided a chucking device in a floppy disk drive, wherein the conduction path has an inclination angle in the range of 30° to 50° backward in the radial direction of the rotor yoke.

In the above constitution, when the drive pin abuts the front edge of the drive pin aperture and the aforesaid conduction path, a sufficient outward pressing force is generated and the drive pin is sure to abut the outer edge of the drive pin aperture against a sliding friction for example.

Further, according to the present invention, there is provided a chucking device in a floppy disk, wherein the plate spring member is mounted to the rotor yoke at the bent portion of the plate member, and the upward pressing portion and the side pressing portion are formed so as to extend from the mounting portion of the plate spring member.

In the above constitution, the plate spring member which can adjust an upward pressure of the upward pressing portion and a side pressure of the side pressing portion independently can be obtained.

Further, according to the present invention, there is provided a chucking device in a floppy disk drive, wherein the upward pressing portion and side pressing portion of the plate spring member are connected in series with each other and one end portion of the connected body is mounted to the rotor yoke.

In the above constitution, the plate spring member can be received compactly in the underside space of the rotor yoke.

DETAILED DESCRIPTION OF PREFERRED EMBODIMENTS

The present invention will be described in more detail hereunder by way of embodiments thereof.
(First Embodiment)

Figure 1:
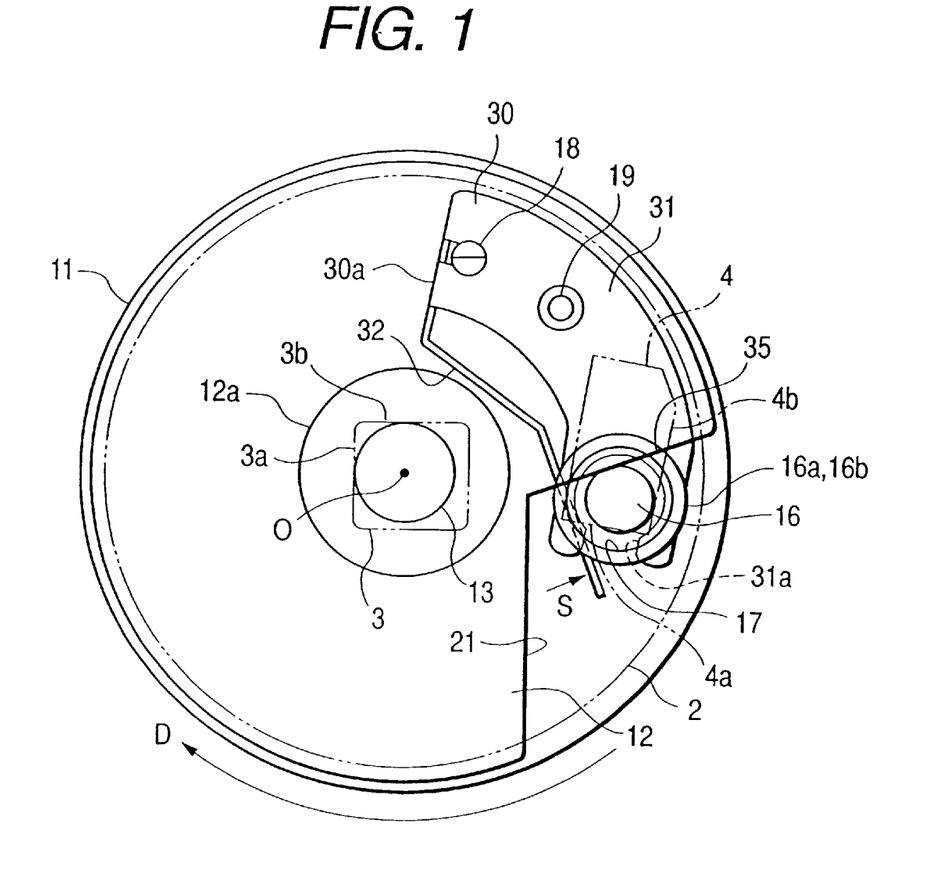
FIG. 1 is a perspective plan view showing an embodiment of the present invention.
Figure 2:
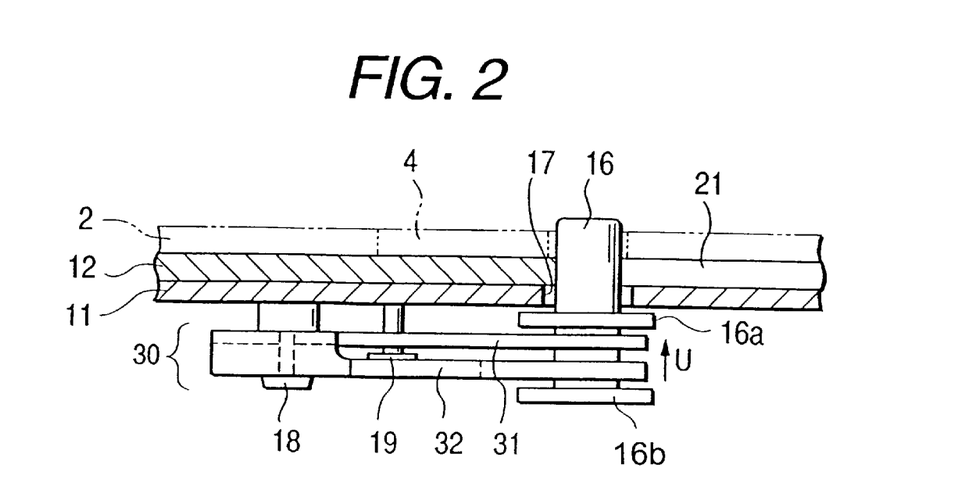
FIG. 2 is a side view showing a principal portion of FIG. 1.

FIG. 1 is a perspective plan view showing a part of a floppy disk drive (FDD) having a chucking device and FIG. 2 is a side view of the FDD chucking device. In both figures, double-dot chain lines represent floppy disk-side elements. Further, in the following description, the constituent elements common to the conventional constituent elements described above with reference to FIGS. 6 and 7 will be identified by the same reference numerals as in those figures and explanations thereof will be omitted or made in brief.

In FIGS. 1 and 2, the FDD in question is constituted by a ferromagnetic metal disk and has a rotor yoke 11 which is rotated in the direction indicated at D by means of a motor (not shown), with a magnetic disk (chucking magnet) 12 being fixed onto the rotor yoke 11.

A center shaft 13 is erected at a rotational axis O of the rotor yoke 11. The center shaft 13 extends through a central opening 12a formed in the magnetic disk 12 and, when a floppy disk is placed on the rotor yoke, the center shaft is inserted loosely into a central aperture 3 formed in a center hub 2 of the floppy disk.

In the peripheral portion of the rotor yoke 11 is formed a drive pin through hole 17, while a cutout portion 21 is formed in the magnetic disk 12 located above the drive pin through hole 17. A drive pin 16 extends loosely through the drive pin through hole 17 and the cutout portion 21 successively from below the rotor yoke 11 and is inserted loosely into a drive pin aperture 4 formed in the peripheral portion of the center hub 2. The drive pin aperture 4 has a front edge 4a and an outer edge 4b.

A plate spring member 30 is mounted with rivet to the underside of the rotor yoke 11 at a mounting portion 18. The plate spring member 30 is constituted by a single plate. This plate is bent at a right angle at a bending portion 30a to form an upward pressing portion 31 extending in an arcuate shape while facing the underside of the rotor yoke 11 and a strip-like side pressing portion 32 perpendicular to the rotor yoke. At the mounting portion 18 located near the bending portion 30a, the plate spring member 30 is mounted with rivet to the underside of the rotor yoke 11. An excess downward bending of the upward pressing portion 31 is prevented by a caulking pin 19 which extends downward from the rotor yoke 11.

A cutout portion 31a for insertion therein of the drive pin 16 is formed in a front end portion of the upward pressing portion 31. The upward pressing portion 31 is urged so as to press upward (in the U direction in FIG. 2) the drive pin 16 thus inserted into the cutout portion 31a. The side pressing portion 32 is urged so that its front end portion presses the drive pin 16 outward (in the S direction).

The drive pin 16 is formed at its lower end portion with both upper flange 16a and lower flange 16b which loosely sandwich the upward pressing portion 31 therebetween vertically. The shaft portion located between the upper flange 16a and the lower flange 16b is inserted into the cutout portion 31a formed in the front end of the upward pressing portion 31 so that it does not come off though fitted therein loosely. Besides, since a downward bending of the upward pressing portion 31 is restricted by the caulking pin 19, even if the drive pin 16 is pushed downward strongly, it will never fall off the drive pin through aperture 17 of the rotor yoke.

The cutout portion 21 formed in the magnetic disk 12 has a conduction path 35 in contact with the drive pin 16 at a rear position in the rotational direction of the disk. The conduction path 35 is inclined at an angle in the range of 30° to 50° backward in the radial direction of the rotor yoke and in a gradually retreating direction (in the direction opposite to the rotational direction D) as the distance from the rotational axis O of the rotor yoke becomes longer.

Upon loading of a floppy disk into the FDD having the chucking device of the first embodiment, the center hub 2 of the floppy disk is dropped onto the magnetic disk 12 in such a manner that the center shaft 13 of the rotor yoke is received in the central aperture 3 formed in the center hub 2 of the recording disk and is attracted magnetically. At this time, it is optional whether the drive pin 16 projecting upward beyond the magnetic disk 12 is to be inserted or not into the drive pin aperture 4 of the center hub. In the case where the drive pin 16 is not inserted into the drive pin aperture 4, the drive pin 16 is depressed from above by the center hub 2 up to the underside level of the center hub 2 against the upward pressure induced by the upward pressing portion 31 of the plate spring member.

When the motor (not shown) is turned ON, causing the rotor yoke 11 to turn fully once at most in the D direction, the top of the drive pin 16, which is urged outward (in the S direction) by the side pressing portion 32 of the plate spring member and also urged upward by the upward pressing portion 31, slides on the underside of the center hub 2 and reaches and is inserted into the drive pin aperture 4. In this state, with further rotation of the rotor yoke 11 in the D direction, the floppy disk retreats relatively by virtue of inertia and the drive pin 16 comes into abutment with the front edge 4a of the drive pin aperture 4.

When the drive pin, which is loosely fitted in the plate spring member 30, abuts the front edge 4a of the drive pin aperture 4 during rotation of the rotor yoke 11, the drive pin is moved back while being pushed by the front edge 4a and comes into abutment with the conduction path 35. In this case, since the conduction path 35 is inclined at an angle of 30° to 50° in a gradually retreating direction as the distance from the rotational axis O of the rotor yoke becomes longer, the drive pin 16 is pushed outward while being held between the front edge 4a and the conduction path 35, then comes into abutment with the outer edge 4b of the drive pin aperture and is pushed thereby. In this way the drive pin 16 is supported at the three points of the front and outer edges 4a, 4b of the drive pin aperture 4 and the conduction path 35 to realize the foregoing "front-outer support."

In this state, the center shaft 13 of the rotor yoke is supported within the center aperture 3 of the floppy disk by two adjacent sides 3a and 3b of the same aperture on the side opposite to the drive pin 16 with respect to the rotational axis O. Now, the center of the recording disk and the rotational axis O of the rotor yoke 11 are coincident with each other and the chucking operation is completed. Once the chucking is completed, the recording disk of the floppy disk does not become eccentric and can rotate smoothly while following up a controlled rotating speed of the rotor yoke 11 exactly.

The drive pin 16 is already urged to the outer edge 4b by the side pressing portion 32 of the plate spring member, but it is the spring that creates the urging force, so if the FDD should undergo a strong vibration, there is the possibility that the drive pin 16 may be moved away from the outer edge 4b by the resulting reaction and that the center of the recording disk may be deviated from the rotational axis O of the rotor yoke 11, allowing the disk to rotate in an eccentric manner. However, since the conduction path 35 is formed in the magnetic disk 12, the drive pin 16 is pushed outward against the outer edge 4b by a pushing force of the conduction path 35, not relying on the action of spring, so that there is no fear of eccentric rotation. This is also true of the case where the conduction path 35 is formed in the drive pin through hole 17 of the rotor yoke 11.

(Second Embodiment)

Figure 3:
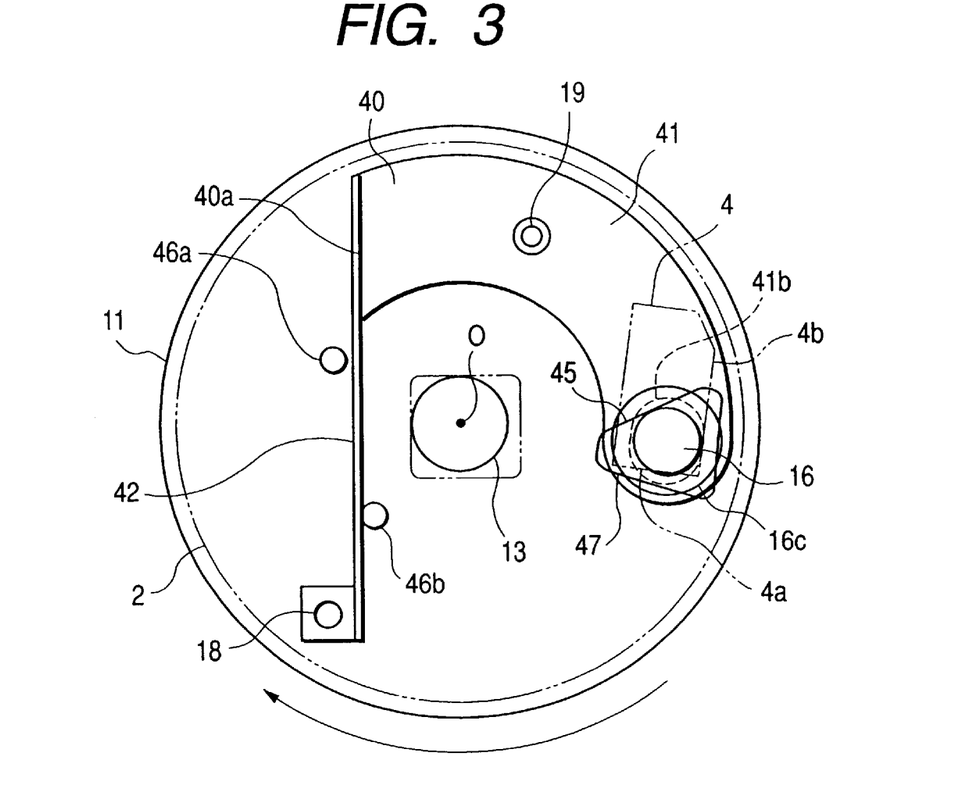
FIG. 3 is a perspective plan view showing another embodiment of the present invention.
Figure 4:
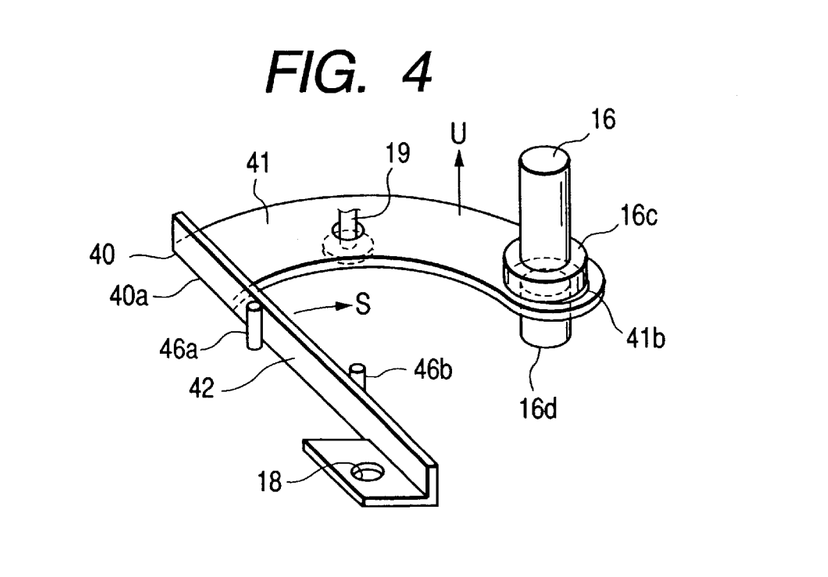
FIG. 4 is a perspective view showing a principal portion of FIG. 3.

FIG. 3 is a perspective plan view showing a part of an FDD having an FDD chucking device according to the second embodiment of the present invention, and FIG. 4 is a perspective view showing a principal portion of the FDD chucking device. In FIG. 3, double-dot chain lines represent floppy disk-side elements. In the following description, the constituent elements common to those explained above in connection with FIGS. 1 and 2 will be identified by the same reference numerals as in those figures and explanations thereof will be omitted or made in brief.

Referring to FIGS. 3 and 4, the FDD illustrated therein, like the FDD in the first embodiment, has a rotor yoke 11 which is rotated in the direction D, and a magnetic disk (not shown) is fixed to the rotor yoke 11. A center shaft 13 is erected at a rotational axis O of the rotor yoke 11, and when the floppy disk is placed on the rotor yoke, the center shaft is inserted loosely into a central aperture 3 formed in a center hub 2 of the floppy disk.

A drive pin through hole 17 is formed in the peripheral portion of the rotor yoke 11 and a conduction path 45 is formed at the rear portion of the drive pin through hole 17. A drive pin 16 extends loosely through the drive pin through hole 17 (and through an unillustrated cutout portion of the magnetic disk) and is inserted loosely into a drive pin aperture 4 formed in the center hub 2.

A plate spring member 40 is mounted with rivet to the underside of the rotor yoke 11 at a mounting portion 18. The plate spring member 40 is constituted by a single plate. This plate is bent at a right angle at a bending portion 40a to form an upward pressing portion 41 which extends arcuately while facing the underside of the rotor yoke 11 and a strip-like side pressing portion 42 perpendicular to the rotor yoke. In the plate spring member 40, the upward pressing portion 41 and the side pressing portion 42 are connected together in series and the mounting portion 18 is formed at a side pressing portion 42-side end of the thus-connected body.

A receiving aperture 41b for insertion therein of the drive pin 16 is formed in the front end of the upward pressing portion 41. The upward pressing portion 41 is urged so as to push upward (in the U direction in FIG. 4) the drive pin 16 inserted into the receiving aperture 41b. A downward bending of the upward pressing portion 41 is restricted by a caulking pin 19.

The side pressing portion 42 is urged so as to push the drive 16 outward (in the S direction) and an excess bending thereof is restricted by limit pins 46a and 46b erected on the underside of the rotor yoke.

The drive pin 16 has a flange 16c at a position where the flange is sandwiched between the underside of the rotor yoke 11 and the upward pressing portion 41 when the drive pin is mounted. The axis of the drive pin 16 extends downward to a lower position than the flange 16c and this extending portion, indicated at 16d, is loosely inserted into the receiving aperture 41b formed in the front end of the upward pressing portion 41. Since the upward pressing portion 41 is restricted its downward bending by the caulking pin 19, there is no fear that the drive pin 16 may fall off the drive pin through hole 17 of the rotor yoke even if it is pushed downward strongly.

The FDD having the chucking device of the second embodiment is installed so that upon loading of the floppy disk into the FDD, the central aperture 3 of the floppy disk center hub 2 receives therein the center shaft 13 of the rotor yoke. In this case, it is optional whether the drive pin 16 projecting upward beyond the magnetic disk is to be inserted or not into the drive pin aperture 4. If the drive pin 16 is not inserted into the drive pin aperture 4, the drive pin is pushed in up to the underside level of the center hub 2 against the upward pressure induced by the upward pressing portion 41 of the plate spring member.

Now, when a motor (not shown) is turned ON, causing the rotor yoke 11 to turn fully once at most in the D direction, since the drive 16 is urged outward (in the S direction) by the side pressing portion 42 of the plate spring member and also urged upward by the upward pressing portion 41, the top of the drive pin slides on the underside of the center hub 2 and reaches and is inserted into the drive pin aperture 4. In this state, when the rotor yoke 11 further rotates in the D direction, the floppy disk retreats relatively by virtue of inertia and the drive pin 16 comes into abutment with the front edge 4a of the drive pin aperture 4.

During rotation of the rotor yoke 11, when the drive pin 16 fitted loosely in the plate spring member 40 abuts the front edge 4a of the drive pin aperture 4, the drive pin retreats while being pushed by the front edge 4a and comes into abutment with the conduction path 45. At this time, since the conduction path 45 is inclined in a gradually retreating direction as the distance from the rotational axis O of the rotor yoke becomes longer, the drive pin 16 is pushed outward while being held between the front edge 4a and the conduction path 45 and is brought into pressure contact with the outer edge 4b of the drive pin aperture. Now, the drive pin 16 is supported by both front edge 4a and outer edge 4b of the drive pin aperture 4, whereby the foregoing "front-outer support" is attained and the chucking operation is completed.

In the FDD shown in FIG. 3, the drive pin 16 is in contact with the outer edge 4b while being held between the front edge 4a and the conduction path 45, that is, the drive pin is supported at three points, so even if the FDD is subjected to a strong vibration or the like, the drive pin will never moves away from the outer edge 4b, thus preventing the occurrence of an eccentric rotation of the recording disk.

(Third embodiment)

Figure 5:
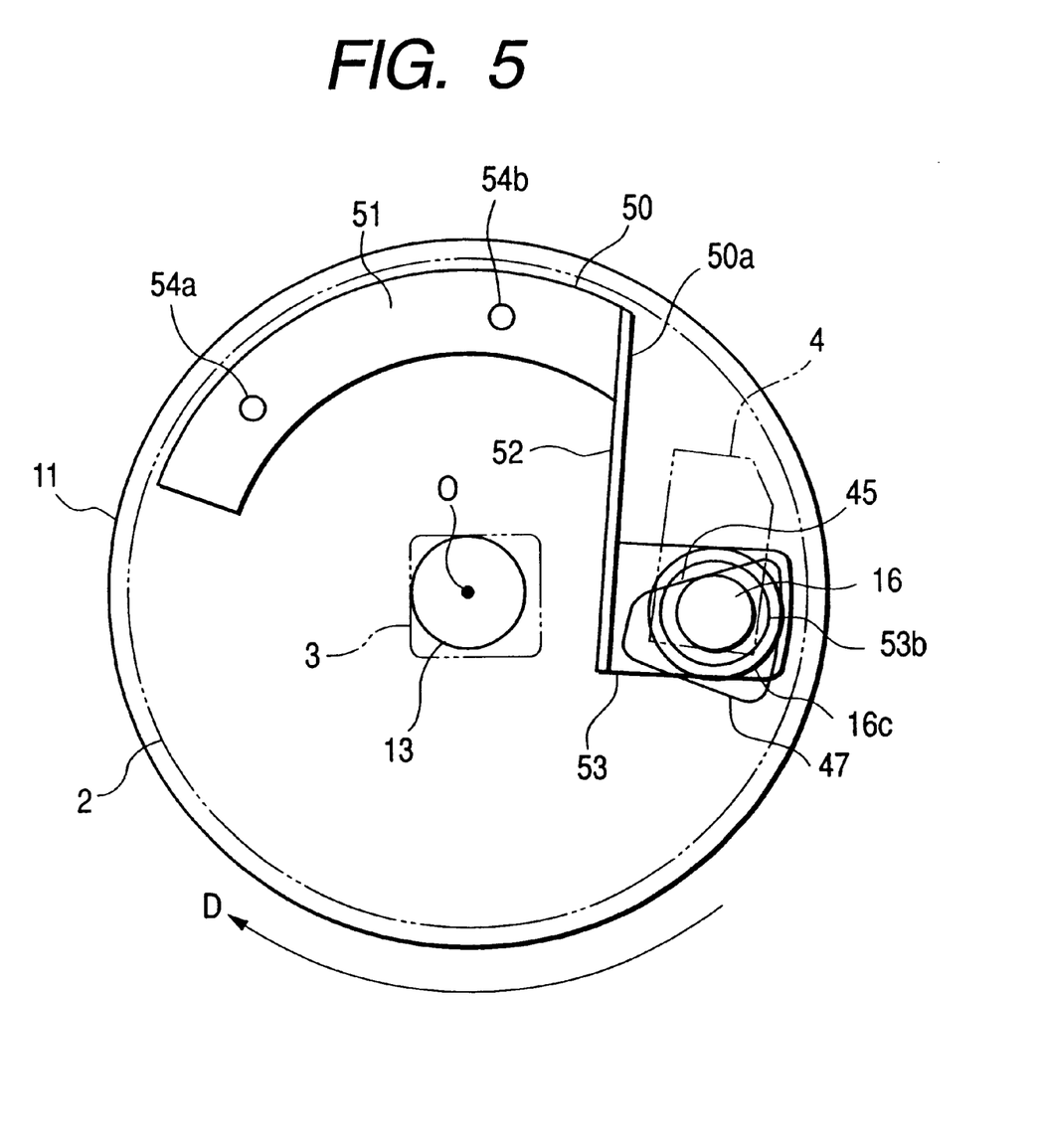
FIG. 5 is a perspective plan view showing a further embodiment of the present invention.

FIG. 5 is a perspective plan view showing a part of an FDD having an FDD chucking device according to the third embodiment of the present invention, provided the illustration of a magnetic disk is omitted. In FIG. 5, double-dot chain lines represent floppy disk-side elements. Further, in the following description, the constituent elements common to those explained above in connection with FIGS. 1 and 2 will be identified by the same reference numerals as in those figures and explanations thereof will be omitted or made in brief.

In FIG. 5, this FDD is the same as that in the previous second embodiment except the structure of a plate spring member used herein which is different from that used in the second embodiment. Therefore, reference will be made below to only the structure of a plate spring member used in this third embodiment.

In FIG. 5, the plate spring member 50 is constituted by a single plate. This plate is bent at a right angle at a bending portion 50a to form a stationary portion 51 extending arcuately while facing the underside of a rotor yoke 11 and a strip-like pressing portion 52 perpendicular to the rotor yoke. The stationary portion 51 is fixed to the rotor yoke 11 with two rivets 54a and 54b which are spaced apart from each other. At the front end of the pressing portion 52 is formed a drive pin mounting portion 53 which is parallel to the surface of the rotor yoke 11. The pressing portion 52 is urged so as to push a drive pin 16 upward and outward in a mounted state of the drive pin to the drive pin mounting portion 53.

In the drive pin mounting portion 53 is formed a receiving aperture 53b for insertion therein of the drive pin 16, and the drive pin 16, which has a flange 16c like that described in the above second embodiment, is loosely fitted into the receiving aperture 53b.

In the FDD chucking device of this third embodiment, since the pressing portion 52 of the plate spring member is formed in a sufficiently elongated shape, it can be urged in any desired direction like a wire spring and it can urge the drive pin 16 not only outward but also upward, thus permitting the floppy disk to be chucked to the same extent as in the first or the second embodiment.

The present invention is not limited to the above first to third embodiments, but various modifications may be made.

For example, in the third embodiment, of the rivets 54a and 54b for fixing the stationary portion 51 to the rotor yoke 11, if the one (54b in FIG. 5) closer to the pressing portion 52 is substituted by a caulking pin capable of being bent downward to some extent, it becomes possible for the stationary portion 51 to push the drive pin 16 upward, thus eliminating the need of urging the pressing portion 52 upward.

There may be used means for further ensuring the dropout of the drive pin 16 from the rotor yoke 11. According to an example of this means, though not shown, an aperture is formed in the rotor yoke separately from and on a concentric arc of the drive pin through aperture, then an arcuate arm is suspended loosely between the separate aperture and the drive pin through aperture, and the drive pin is projected from the arm through the drive pin through aperture.

Further, magnetic disk 12 used in the first embodiment, without the cutout portion 21 formed therein, may be formed in an annular shape overlapping the peripheral edge portion of the center hub 2 in a range not obstructing the motion of the drive pin 16, and a conduction path forming member such as a synthetic resin member may be attached to the rotor yoke 11 separately from the magnetic disk and as a substitute for the conduction path 35 of the cutout portion 21.

The chucking device of the present invention described above in detail, in comparison with the conventional one illustrated in FIGS. 6 and 7, is simple in structure and easy to assemble because the driving arm does not have any rocking mechanism, further, it can realize the foregoing front-outer support positively and less expensively, and an eccentric rotation of the recording disc can be surely prevented.

What is claimed is:

1. A chucking device in a floppy disk drive, comprising:
   a rotor yoke adapted to rotate in a predetermined certain direction;
   a magnetic disk fixed onto an upper surface of said rotor yoke and attracting a center hub of a floppy disk magnetically;
   a center shaft erected at a rotational axis of said rotor yoke and inserted loosely into a central aperture of said center hub through a central opening formed in said magnetic disk;
   a drive pin extending loosely and successively through a drive pin through hole formed in a peripheral portion of said rotor yoke and then through a cutout portion formed in said magnetic disk, said drive pin being also inserted loosely into a drive pin aperture formed in a peripheral portion of said center hub, said drive pin aperture having a front edge at a front portion thereof in a rotational direction of said rotor yoke and also having an outer edge in a direction away from the rotational axis of said rotor yoke; and
   a plate spring member mounted to a lower surface of said rotor yoke and formed so as to apply a biasing force to said drive pin in an upward direction and in a direction away from the rotational axis of the rotor yoke,
   wherein a lower end portion of said drive pin is loosely fitted in a drive pin mounting portion of said plate spring member in a manner that permits the drive pin to move independently of the plate spring member within a predetermined range,
   said drive pin through hole of said rotor yoke or said cutout portion of said magnetic disk has a conduction path in contact with a rear portion of said drive pin, said rear portion being located on a side of said drive pin away from the rotational direction of the rotor yoke, said conduction path being inclined in a gradually retreating direction as the distance from the rotational axis of the rotor yoke becomes longer, and
   when said rotor yoke is rotated with the floppy disk placed on the rotor yoke and with said center shaft inserted into the central aperture of said center hub, said drive pin is inserted into said drive pin aperture of the center hub and comes into abutment, within the drive pin aperture, with the front and outer edges of the drive pin aperture and also with said conductor path.

2. A chucking device in a floppy disk drive according to claim 1, wherein said plate spring member is constituted by a single plate, said plate being bent at a right angle to form an upward pressing portion which faces said rotor yoke and a side pressing portion perpendicular to the rotor yoke, said upward pressing portion being formed so as to push said drive pin upward, and said side pressing portion being formed so as to push the drive pin in a direction away from the rotational axis of the rotor yoke.

3. A chucking device in a floppy disk drive, comprising:
   a rotor yoke adapted to rotate in a predetermined certain direction;
   a magnetic disk fixed onto an upper surface of said rotor yoke and attracting a center hub of a floppy disk magnetically;
   a center shaft erected at a rotational axis of said rotor yoke and inserted loosely into a central aperture of said center hub through a central opening formed in said magnetic disk;
   a drive pin extending loosely and successively through a drive pin through hole formed in a peripheral portion of said rotor yoke and then through a cutout portion formed in said magnetic disk, said drive pin being also inserted loosely into a drive pin aperture formed in a peripheral portion of said center hub, said drive pin aperture having a front edge at a front portion thereof in a rotational direction of said rotor yoke and also having an outer edge in a direction away from the rotational axis of said rotor yoke; and
   a plate spring member mounted to a lower surface of said rotor yoke and formed so as to apply a biasing force to said drive pin in an upward direction and in a direction away from the rotational axis of the rotor yoke,
   wherein a lower end portion of said drive pin is loosely fitted in a drive pin mounting portion of said plate spring member in a manner that permits the drive pin to move independently of the plate spring member within a predetermined range, said drive pin mounting portion of said plate spring member has a cutout portion for insertion therein of the lower end portion of said drive pin, and the lower end portion of the drive pin thus inserted into said cutout portion is formed with upper and lower flanges for holding the plate spring member therebetween in a vertically loose condition, thereby preventing the drive pin from falling off the plate spring member, said drive pin through hole of said rotor yoke or said cutout portion of said magnetic disk has a conduction path in contact with a rear portion of said drive pin, said rear portion being located on a side of said drive pin away from the rotational direction of the rotor yoke, said conduction path being inclined in a gradually retreating direction as the distance from the rotational axis of the rotor yoke becomes longer, and when said rotor yoke is rotated with the floppy disk placed on the rotor yoke and with said center shaft inserted into the central aperture of said center hub, said drive pin is inserted into said drive pin aperture of the center hub and comes into abutment, within the drive pin aperture, with the front and outer edges of the drive pin aperture and also with said conductor path.

4. A chucking device in a floppy disk drive according to claim 1, wherein said conduction path has an inclination angle in the range of 30° to 50° backward in the radial direction of said rotor yoke.

5. A chucking device in a floppy disk drive according to claim 2, wherein said plate spring member is mounted to said rotor yoke at the bent portion of said plate and is formed so that said upward pressing portion and said side pressing portion thereof extend from said mounted portion of the plate spring member.

6. A chucking device in a floppy disk drive according to claim 2, wherein said upward pressing portion and said side pressing portion of said plate spring member are connected in series with each other and one end portion of the thus-connected body is mounted to said rotor yoke.

* * * * *